June 15, 1937.  M. P. WINTHER  2,083,971
AIR CONDITIONING SYSTEM
Filed Dec. 26, 1931
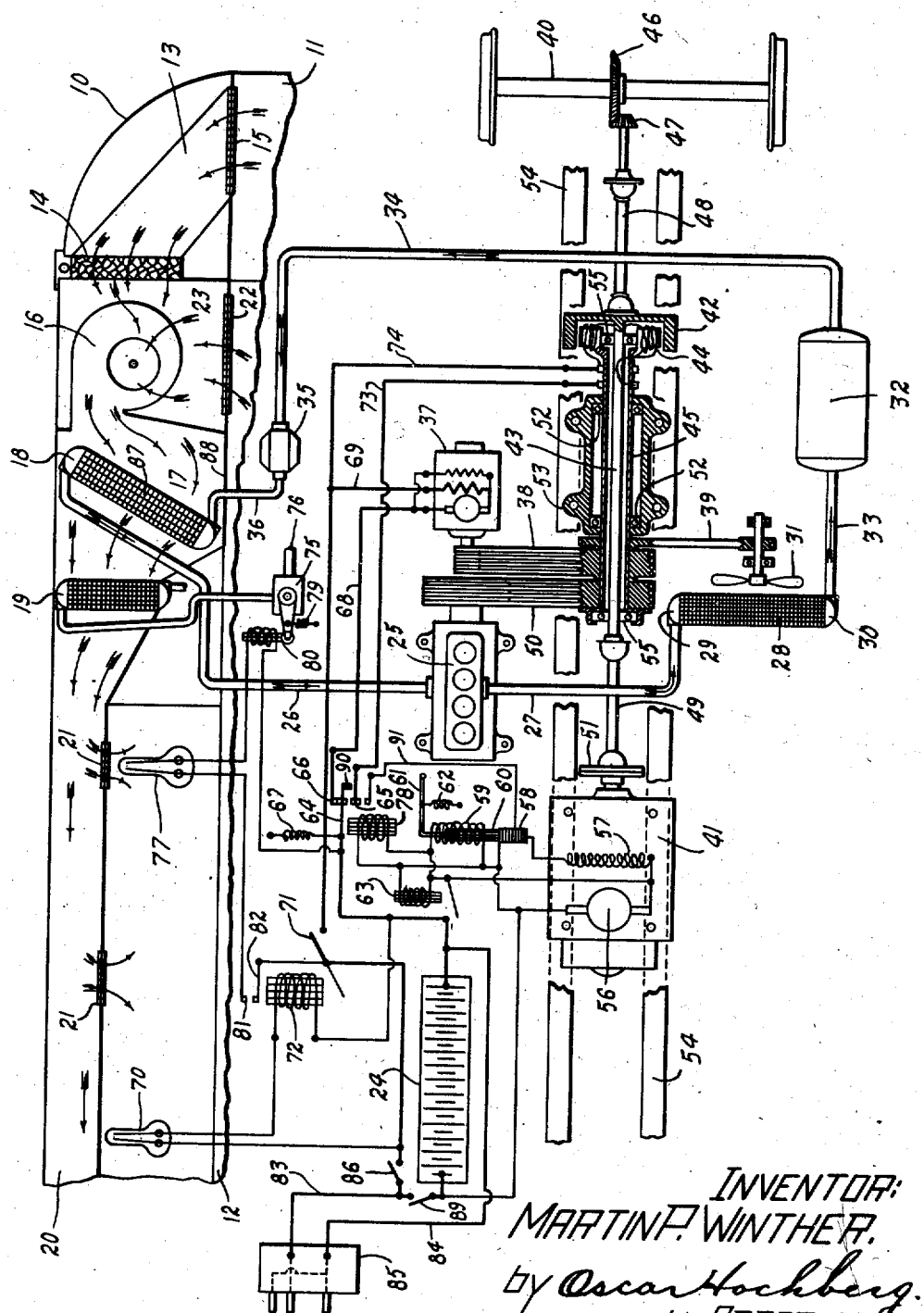
INVENTOR:
MARTIN P. WINTHER.
by Oscar Hochberg
his ATTORNEY.

Patented June 15, 1937

2,083,971

UNITED STATES PATENT OFFICE 2,083,971

AIR CONDITIONING SYSTEM

Martin P. Winther, Waukegan, Ill., assignor, by mesne assignments, to Pullman-Standard Car Manufacturing Company, a corporation of Delaware Application December 26, 1931, Serial No. 583,210

18 Claims. (Cl. 62—117)

The invention relates generally to air conditioning systems for railways cars and utilizing preferably refrigerating systems of the compression type adapted to be driven by mechanism operated directly from the truck axle thru the medium of an electric clutch device forming part of the propeller shaft assembly.

The invention more specifically contemplates the use of a non-toxic refrigerant in the refrigerating circuit and preferably dispenses with secondary cooling circuits heretofore employed for transferring heat from the car interior to the refrigerating apparatus.

The invention makes further provision for continuous operation of the refrigerating system by secondary drive mechanism energized at relatively low car speed levels or when the generator output falls below a predetermined voltage.

The invention also comprehends thermostatic control of the refrigerating system whereby the compressor may be operated or cut out when the temperature in the car reaches critical stages above or below predetermined points on the thermometer and independently of car speed or generator voltage.

The invention embodies means for heating of the car in cold weather and provides for thermostatic control of the heating medium whereby the heat control circuit is broken when the refrigerating mechanism is in use and closed when the refrigerating mechanism is not in operation.

In air conditioning systems previously used, three separate circuits have been necessary to provide secondary refrigerating systems for cooling the air of the car since it was desirable that the primary refrigerating circuit, containing a volatile fluid, usually toxic, be installed outside the car to avoid contamination of the air stream within the car resulting from possible leakage of the refrigerant from the circulating conduits. Then, too, it was necessary to provide cooling water for the condenser and compressor, the water being drawn from a cooling tower to which it was returned in the form of a spray and again cooled by a fan at the tower position and again pumped thru another cycle in the circuit.

The brine for cooling had first to be conducted thru an evaporator tank in the primary refrigerant circuit where it gave up its heat to the surrounding refrigerant, thence to the cooling coil in the air stream where it absorbed heat and was again returned to the evaporator tank. In addition to the pumps required for the brine and water circuits, it was necessary to provide a fan to cool the water spray in the water tower and separate motors for each of these devices and essential water storage tank, piping, valves, wiring and switches incident to such installation.

In view of the multiplicity of parts in the several circuits designed to function independently of parts in associated circuits, and the requirement that the system carrying the primary refrigerant be confined to positions outside the car to avoid possible injury to car occupants resulting from the toxic character of such liquid in the event of leakage in the system, coupled with the difficulty in accommodating such apparatus in the limited space available within and beneath the car and the resultant high cost of maintenance and excessive weight of such equipment, rendered the general adoption of available air conditioning apparatus little short of prohibitive. The electrical equipment thus required by the several pump, fan and compressor motors taxed the capacity of the special generator designed to drive them and unduly stressed the generator drive mechanism connection at the axle.

It is therefore the province of this invention to provide an air conditioning system having positive drive connection with the car axle, and providing complete electrical control for starting and stopping the refrigerating mechanism independently of the drive and car speed.

A further object is to provide a dual drive for the system directly from the car axle to effect continuous operation of the compressor in the refrigerating circuit above a predetermined minimum car speed.

A further and important purpose is the provision of a dual drive shaft adapted for direct connection with the generator and compressor elements of the refrigerating system and fitted with an electric clutch device operable to permit independent or simultaneous operation of the shaft parts and the generator and compressor elements respectively.

The foregoing and other advantages are obtained and objections overcome by the mechanism illustrated in the accompanying drawing in which is shown diagrammatically, the installation of the air conditioning mechanism upon a railway car having a suitable air duct system above the passenger space in the car. In said drawing the cooling and heating apparatus and generator and battery equipment with electrical control circuits connecting the several units are schematically indicated. The car 10 may be provided with a vestibule 11 at one of its ends from which fresh air may be drawn to the car interior 12.

An intake duct 13 leading to an air filter 14 communicates with the vestibule thru register 15, the air being drawn in by means of a blower 16 thru the filter to chamber 17 containing an evaporator 18 and radiator 19 communicating with ducts 20 extending along the car with outlets 21 opening to the car interior. The air in the car may be re-circulated by drawing the air thru intake 22 in mixing chamber 23 from which it is again returned with a supply of new air to the evaporator coil in chamber 17 to be cooled, thru the ducts, thence thru emission openings 21 to car interior, without again passing such re-circulated air thru the filter 14, but conditioned to provide an ample supply of clean and healthful air to the passengers.

The heat exchange or evaporator 18 forms the air cooling unit of the refrigerating system which comprises the reciprocating compressor 25 adapted to withdraw the heated gases from evaporator 18 thru connecting pipe 26 and compressing the gas into pipe 27 and thence to a condenser of the conventional type having a bank of fin piping 28 communicating with headers 29 and 30 at their upper and lower ends, respectively. The refrigerant from the compressor enters the header 29 under pressure and is condensed in the pipes 28 during its passage to the lower header 30 by the cooling action of the fan 31 directly connected to primary drive mechanism hereinafter referred to, whereby a current of air is forced thru the bank of condenser pipes 28.

From the condenser, the now liquid refrigerant flows into a liquid receiver 32 from pipe 33 connecting receiver with condenser head 30, from which it is forced upwardly thru pipe 34 to expansion valve 35 and under reduced pressure thru pipe 36 whence it enters the cooling coil or evaporator unit 18 to be again vaporized by the heat taken up from the air stream from the blower 16, and the heated gas is again withdrawn from the evaporator as before for readmission to the cycle. The units of the refrigerant cycle outlined constitute the entire mechanism of the system for the direct cooling of the air stream, the use of a non-toxic refrigerant making possible the complete elimination of the brine and water circuits heretofore considered indispensable.

The system of direct cooling of the air as above described renders practicable the driving of the moving parts directly from the truck axle 40 since that may be done with a minimum power loss thru the electric clutch, gear and belt elements of the drive mechanism to be presently described.

The driving mechanism performs the functions of a direct drive for the power supply generator 41 and a similar drive for the compressor 25 of the refrigerating system as will hereinafter appear, the two drives, tho associated, being capable of united or independent operation thru the medium of an electric clutch device having its ring member 42 fixed to the generator drive shaft 43 and its coil member 44 secured to the compressor drive shaft 45.

This shaft drive assembly may be designated the primary drive mechanism and is operable directly from the axle thru the bevel gear 46 and bevel pinion 47, flexible shaft 48, clutch shaft 43, and flexible shaft 49 to the generator, and from the clutch ring 42, to coil member 44 when energized, to quill shaft 45 to compressor 25 thru belt 50 and to condenser fan 31 thru belt 39. It will be noted that the generator and motor heretofore used to drive the compressor have been eliminated, but one generator 41 being used to supply power for lighting purposes and to charge storage battery 24 providing a secondary source of power for auxiliary compressor drive motor 37 flexibly connected to compressor 25 by means of driving belt 38 to quill shaft 45, which is then disengaged from the electric clutch ring 42, thence thru belt 50 to the compressor. Thus two sources of energy are made available for driving the compressor, one the direct or primary drive from the car axle without the use of intervening generator and motor before noted, and a secondary or indirect drive from an electric motor supplied from the storage battery. Obviously, the fan will be driven by the quill shaft 45 in the direction of rotation of said shaft as determined by direction of car movement at the time energization of the clutch element 44 is effected. In one direction of car and quill shaft movement during the effective period of the clutch, the condenser fan 31 will rotate with the quill shaft to gather in the air 28, and force it thru the bank of condenser piping 28, and upon reverse movement of car and quill shaft the fan rotation will also be reversed and the fan will operate to draw air thru the condenser coil 28 in the opposite direction, but such reverse movement of the air stream will as effectively cool the condenser as when such air stream flows from the opposite direction. It will be noted that the air stream passing thru the condenser will thus be discharged from the condenser towards the rear of the train, that is to say, in a direction opposite to that of car movement.

Provision is made to prevent shock to generator armature and supporting gear from sudden stoppage of the car. Between the armature shaft and driving shaft section 49 is interposed a friction clutch device 51 of any suitable type designed to permit slippage between armature and drive at torques above those required for driving the generator. If desired, such clutch may be positioned on the drive shaft section 48 and adjacent electric clutch ring 42, should that disposition be found more convenient. As indicated on the drawing, the quill shaft portion 45 of the direct drive is journaled in bearings 52 fitted in a supporting frame 53 secured to the underside of center sills 54 of the car. The quill shaft thus supported is itself formed to accommodate bearings 55, preferably at opposite ends of the shaft, within which is supported the generator drive shaft portion 43 carrying the electric clutch ring 42.

The generator is likewise secured to the center sill in position for axial connection with the driving shaft portion 49 and conveniently accessible for inspection. The generator 41 is indicated diagrammatically with its commutator designated as 56 and shunt field 57 and its voltage regulated by carbon pile 58 connected in series with the field circuit 57 for controlling generator excitation, and the solenoid 59, the plunger 60 of which acts directly on the carbon pile 58.

The plunger of the solenoid is held against the carbon pile by the bent arm 61 thru the spring 62 which is adjusted to balance the magnetic pull of the coil on plunger 60 since the solenoid coil 59 is connected directly across the armature 56 and therefore directly affected by generator output, so that with decreasing current thru coil 59, plunger 60 operates to compress the carbon pile 58 to raise the field current and increase generator voltage. Provision for closing the battery circuit for charging is made by placing a relay coil 63 directly across the terminals of solenoid coil 59 for actuation by voltage output of the generator.

When generator voltage is above a predetermined minimum, switch arm 64 will, through medium of insulated buffer 90, place point 65 in contact with wire 91, but when the voltage drops below the effective minimum the arm 64 will contact with point 66. The relay arm 64, actuated by relay 78, will normally bear against point 66 under pull of spring 67 designed to balance the relay so that the circuits 68 and 69 leading to the compressor motor 37 will be energized from the battery 24, provided the car thermostat 70, positioned in the cold zone above the floor of the car and controlling the cooling of the car, has closed switch 71 thru relay 72 when either the electric motor will be energized from the battery or the electric clutch coils 44. Since the speed of the car determines the speed of the generator 41 and hence its voltage, the voltage of the generator will determine the position of relay arm 64.

If the car speed is high, the current from generator 41 will move relay arm 64 by means of insulated buffer 90 and place point 65 in contact with wire 91, to energize the electric clutch coils 44 thru circuits 73 and 74 to drive the compressor 25 directly from quill shaft 45 thru belt 50. If the car is standing still or when the generator voltage drops below the effective minimum, the relay arm 64 will contact with point 66 to close circuits 68 and 69 to energize the electric motor from the battery to drive the compressor 25.

The invention further provides for the heating of the car in cold weather by means of the radiator 19 supplied with hot water vapor or steam thru valve 75 communicating with a source of steam supply 76, the valve being controlled by thermostat 77 positioned adjacent duct outlet 21. The steam valve 75 is held normally closed by the tension of spring 79 and is actuated by relay 80 controlled by heat thermostat 77 whenever the temperature of the warm air stream from the duct openings 21 falls below a predetermined minimum comfortable to the passengers.

The change automatically from cold to warm weather operation of the system is effected thru the medium of a switch 81 controlled by cold thermometer 70 and relay 72. With relay arm 82 in contact with point 81, the circuit to relay 80 is energized to open the steam valve 75, but when the cooling system is in operation the circuit from battery 24 to the steam valve relay 80 is broken by the opening of switch 81 when relay arm 82 has been actuated by relay 72 even though the heat thermostat 77 may also be closed, thereby insuring the complete separation of cooling and heating circuits whenever the air in the car rises to a predetermined temperature at which the thermostat 70 becomes operative to energize relay 72 to close the circuits 68—69 to the electric motor 37 or circuits 73—74 to the electric clutch coils 44, to start the compressor 25.

The electro-dynamic drive members 42 and 44 connecting the positive drive to the compressor will act almost as a solid clutch with practically no slip in the drive at comparatively low speeds. When relatively high speeds are attained and the compressor is operating at maximum permissible speed with capacity output, the drive speeds of the clutch parts will automatically change because of the decreased current supply to the field coils 44 when carbon pile 58 is actuated for generator field control.

The driving clutch ring 42 may increase its speed without proportionately increasing the speed of the driven coil member 44 directly connected to the compressor so that the compressor speed may be maintained within its rated capacity independently of the relatively high speed of the driving clutch ring 42 due to the lag in the driven clutch member 44. As the speed of the train advances, the generator voltage increases and the carbon pile 58 is actuated to regulate the current flow into the coils of driven clutch member 44 and thereby regulating the speed of the compressor by varying the slip between clutch members 42 and 44. It will be noted that the drive from the axle may rotate the compressor 25 in clockwise or counter-clockwise direction but that the motor 37 driving the compressor will always rotate the compressor in one and the same direction unless the motor wiring is arranged to change the motor rotation. Thus it becomes possible for the axle drive to rotate the compressor in a direction reverse of that obtained when motor 37 becomes operative. When car speed is increased, the generator voltage builds up to energize relay 78 which draws arm 64 away from contact 66 to open the circuit to the motor, whereupon the buffer 90 on arm 64 will press contact point 65 against the contact on wire 91 to close the circuit energizing the driven clutch members 44 thereby to transfer the drive from the motor 37 to quill shaft 45 directly connected to the compressor. Therefore, the change from motor to axle drive takes place at a rotative speed sufficiently low to nullify the effects of rotation reversal.

In the placement of the evaporator 18, the fin pipes 87 are preferably placed at an angle to the direction of the air stream from the blower 16 to provide impinging planes for the air passing thru the cooling coil so that the fin surfaces will collect moisture condensed upon them by the rapid extraction of heat from the moving air and allow it to drain off to a drip pan 88 beneath the coils. The evaporator thus acts to dehumidify the air entering the car, both new and re-circulated, to maintain the atmosphere within the car comfortable to the passengers and in sanitary condition.

Provision is made for charging the battery 24 by power lines available at all railroad terminals. For this purpose, the battery circuit lines 83 and 84 are extended to a charging receptacle 85 of standard type adapted to receive the supply plug of the station power lines. A manually operated switch 86, normally closed, is conveniently placed in the battery circuit 83—84 to cut off the current from the whole system when repairs or replacements are being made. Further provision is made for energizing the compressor drive motor directly from the station power lines during protracted stops at stations or for the purpose of precooling the car at terminal points to avoid excessive drafts upon the storage battery supply. A manually operable switch 89, normally closed, is interposed in the battery circuit to permit operation of compressor motor directly from the power lines thru the charging plug 85 without drawing upon the battery for its current supply.

In the practical application of the invention, all of the moving parts of the mechanical refrigeration systems have been mounted upon a small sub-frame beneath the car in position to be readily dismantled and serviced. In this position the condenser has the benefit of natural drafts produced by car movement. The system also effects considerable economy in the reduction in the size of the switches resulting from the reduction in the amount of current required for its operation.

It will be noted that the entire air conditioning system is effectively and automatically controlled by the operation of electrical thermostats 70 and 77 so positioned in the car as to be instantly responsive to critical changes in the temperature of the incoming air and that already delivered to maintain a uniform mean temperature throughout the car interior in warm and cold weather. The system is compact and simple and economically maintained since the parts are rugged and relatively few in number and may be accommodated in less space on the car than is possible with systems heretofore proposed and of like capacity.

Electro-magnetic clutch field control is provided thru a portion of generator field control carbon pile 58, thru wire 91 from contact 65. The insulated actuating buffer 90 serves to move contact 65 into engagement with contact on wire 91. A separate carbon pile may be used for controlling field current to coils 44 instead of the scheme shown. The position at which wire 91 is connected to carbon pile 58 depends upon the value of the electric clutch coils 44. In the arrangement as shown, the voltage to coils 44 is less than the generator or battery voltage, being tapped off at a point between the negative and positive terminals of carbon pile 58 which is in series with generator field coil 57.

The generator shown is fitted with a standard type of polarity changing device to permit generator voltage to build up when the rotation of the generator is reversed. A floating brush support is used wherein the brush holder is moved into the proper position for the respective polarity in accordance with direction of rotation of the generator. The energy for rotating the brush holder results from the friction of the brush upon the commutator. This polarity change takes place automatically upon reversal of rotation of the generator.

What I claim is:—

1. In an air conditioning system for cars, a refrigerant compressor, a primary axle drive for the compressor, a secondary electric motor drive for the compressor, a source of current on the car for operating the electric motor, means responsive to car speed for selecting the drive for the compressor, and thermostatic means associated with said drives for making the selected drive effective to operate the compressor only when cooling is desired.

2. In an air conditioning system for cars, a refrigerant compressor, a primary axle drive for the compressor, a secondary electric motor drive for the compressor, a source of current on the car for operating the electric motor, and means responsive to car speed for selecting the drive for the compressor.

3. In a refrigerating system, a compressor, a thermostat, primary and secondary mechanisms for alternatively driving the compressor, automatic switch means for energizing one or the other of said driving mechanisms, said switch means being responsive to the thermostat and the speed of one of the driving mechanisms.

4. In a vehicle, a compressor, a generator, means for driving the generator from one of the car axles, means including a clutch for driving the compressor from one of the car axles, an electric motor, means connecting the motor to the generator whereby the motor drives the compressor under certain conditions by electrical energy furnished by the generator, and automatic means for opening the clutch when the vehicle speed falls below a predetermined minimum and substantially simultaneously causing the electric motor to drive the compressor.

5. In a vehicle, a compressor, a generator, means for driving the generator by power taken from a car axle, a drive mechanism associated with said means for operating the compressor by car axle rotation, an electric motor, means connecting the motor to the generator whereby under certain conditions the motor drives the compressor by electrical energy furnished by the generator, and an electric clutch in the drive mechanism for automatically disconnecting the compressor from the car axle when the vehicle is moving at low speeds.

6. In a vehicle, a compressor, a primary drive for the compressor including a clutch and a part rotating in proportion to vehicle speed, a secondary drive for the compressor including a part rotating in proportion to vehicle speed, a generator driven by said latter part, a battery, and an electric motor having a driving connection with the compressor and connected in parallel with the generator and battery, and means responsive to vehicle speed for selecting the drive for the compressor and for opening the clutch when the secondary drive is effective.

7. In a vehicle, a compressor, a generator, a part rotating in proportion to vehicle speed, a dual drive mechanism actuated by said part for driving the compressor and generator and having a direct operating engagement with the generator and an electro-dynamic clutch connection with the compressor, electrical means for controlling the slippage of the clutch according to vehicle speed, and means for opening the clutch to disconnect the compressor from the drive without interrupting operation of the generator.

8. In an air conditioning system for vehicles, a cooling system including a refrigerant compressor, a drive for the compressor including a part rotatable in proportion to car speed, an electro-dynamic clutch in the drive, electrical means responsive to the speed of the vehicle for controlling the slippage of the clutch, and thermostatic means for opening the clutch when operation of the compressor is not required.

9. In a vehicle air conditioning system comprising a compressor, a condenser, a fan for said condenser, primary and secondary power mechanism for alternatively driving said compressor and with it said condenser fan, a car truck axle connected with said driving mechanism, and means on said primary drive for intermittently actuating said condenser fan and compressor, said means being adapted for rotating the condenser fan in a direction designed to cause the air stream passing thru the condenser to be discharged therefrom in a direction opposite to that of car movement.

10. A vehicle having a refrigerating system including a compressor, a live axle drive for said compressor, a motor drive for said compressor, means responsive to temperature conditions for starting and stopping said compressor, and means responsive to car speed for automatically selecting between said axle drive and said motor drive for said compressor.

11. In a vehicle, a refrigerating system including an air cooled heat dissipation device mounted transversely on the vehicle in a position to take advantage of the natural draft produced by car movement, a fan associated with said device, means for driving the fan, and means for changing the direction of rotation of the fan whenever the car changes its direction of movement so that the fan always aids rather than opposes the natural draft produced by car movement.

12. In a refrigerating system for cars a compressor, a condenser, a fan for the condenser, a primary device actuated by a moving part of the car for operating the compressor, a secondary motor drive for the compressor, means for driving the fan from the primary drive so that its direction of rotation is dependent upon the direction of car movement, and means for driving the fan when the secondary motor drive is effective.

13. In a vehicle, refrigerating apparatus comprising in combination, a live axle, a compressor, a clutch actuated drive from said axle to said compressor, and automatically variable compressor speed control means in said drive between said axle and compressor.

14. In a vehicle, a compressor, means for actuating said compressor comprising a primary dual shaft mechanism including a car truck axle and a propeller shaft portion, a quill shaft portion in spaced concentric relation to and of less length than said propeller shaft and having direct driving connection with said compressor, an electric clutch mechanism at one end of said quill and contiguous portion of the propeller shaft, an automatic switch mechanism for alternately energizing and de-energizing said clutch, and speed controlled relay means for selectively operating said switch to permit intermittent operation of the compressor.

15. In a vehicle, a compressor, means for actuating said compressor comprising a car truck axle, a primary dual shaft mechanism including a propeller shaft driven from said axle and a quill shaft portion, a supporting frame for said shaft drive mechanism secured to the car, bearings between said frame and drive members for holding said shafts in spaced concentric relation, an electric clutch mechanism mounted upon and operable to connect said shafts, and speed controlled relay means effective to energize and de-energize said clutch to respectively start and stop the compressor.

16. In a vehicle, the combination of an electric clutch, an axle, means for driving the clutch from said axle, a compressor, an electric motor, means for automatically driving the compressor from the electric motor when the vehicle is below a predetermined speed and means for driving the compressor from the electric clutch when the vehicle is operating above said predetermined speed.

17. In a vehicle, the combination of an axle, a compressor, drive mechanism from said axle to said compressor including an electric clutch and an energizing circuit, and means for automatically opening said circuit below a predetermined vehicle speed.

18. In a vehicle, refrigerating apparatus comprising in combination, a live axle, a compressor, a clutch actuated drive from said axle to said compressor, variable speed ratio control means in said drive between said axle and compressor, and temperature responsive means for actuating said compressor speed ratio control means in response to refrigerating demand.

MARTIN P. WINTHER.

CERTIFICATE OF CORRECTION.

Patent No. 2,083,971.  June 15, 1937.

MARTIN P. WINTHER.

It is hereby certified that error appears in the printed specification of the above numbered patent requiring correction as follows: Page 3, second column, line 67, for "systems" read system; page 5, first column, line 8, claim 12, for "device" read drive; and that the said Letters Patent should be read with these corrections therein that the same may conform to the record of the case in the Patent Office.

Signed and sealed this 14th day of September, A. D. 1937.

(Seal)

Henry Van Arsdale
Acting Commissioner of Patents.

for changing the direction of rotation of the fan whenever the car changes its direction of movement so that the fan always aids rather than opposes the natural draft produced by car movement.

12. In a refrigerating system for cars a compressor, a condenser, a fan for the condenser, a primary device actuated by a moving part of the car for operating the compressor, a secondary motor drive for the compressor, means for driving the fan from the primary drive so that its direction of rotation is dependent upon the direction of car movement, and means for driving the fan when the secondary motor drive is effective.

13. In a vehicle, refrigerating apparatus comprising in combination, a live axle, a compressor, a clutch actuated drive from said axle to said compressor, and automatically variable compressor speed control means in said drive between said axle and compressor.

14. In a vehicle, a compressor, means for actuating said compressor comprising a primary dual shaft mechanism including a car truck axle and a propeller shaft portion, a quill shaft portion in spaced concentric relation to and of less length than said propeller shaft and having direct driving connection with said compressor, an electric clutch mechanism at one end of said quill and contiguous portion of the propeller shaft, an automatic switch mechanism for alternately energizing and de-energizing said clutch, and speed controlled relay means for selectively operating said switch to permit intermittent operation of the compressor.

15. In a vehicle, a compressor, means for actuating said compressor comprising a car truck axle, a primary dual shaft mechanism including a propeller shaft driven from said axle and a quill shaft portion, a supporting frame for said shaft drive mechanism secured to the car, bearings between said frame and drive members for holding said shafts in spaced concentric relation, an electric clutch mechanism mounted upon and operable to connect said shafts, and speed controlled relay means effective to energize and de-energize said clutch to respectively start and stop the compressor.

16. In a vehicle, the combination of an electric clutch, an axle, means for driving the clutch from said axle, a compressor, an electric motor, means for automatically driving the compressor from the electric motor when the vehicle is below a predetermined speed and means for driving the compressor from the electric clutch when the vehicle is operating above said predetermined speed.

17. In a vehicle, the combination of an axle, a compressor, drive mechanism from said axle to said compressor including an electric clutch and an energizing circuit, and means for automatically opening said circuit below a predetermined vehicle speed.

18. In a vehicle, refrigerating apparatus comprising in combination, a live axle, a compressor, a clutch actuated drive from said axle to said compressor, variable speed ratio control means in said drive between said axle and compressor, and temperature responsive means for actuating said compressor speed ratio control means in response to refrigerating demand.

MARTIN P. WINTHER.

CERTIFICATE OF CORRECTION.

Patent No. 2,083,971.   June 15, 1937.

MARTIN P. WINTHER.

It is hereby certified that error appears in the printed specification of the above numbered patent requiring correction as follows: Page 3, second column, line 67, for "systems" read system; page 5, first column, line 8, claim 12, for "device" read drive; and that the said Letters Patent should be read with these corrections therein that the same may conform to the record of the case in the Patent Office.

Signed and sealed this 14th day of September, A. D. 1937.

(Seal)

Henry Van Arsdale
Acting Commissioner of Patents.

CERTIFICATE OF CORRECTION.

Patent No. 2,083,971. June 15, 1937.

MARTIN P. WINTHER.

It is hereby certified that error appears in the printed specification of the above numbered patent requiring correction as follows: Page 3, second column, line 67, for "systems" read system; page 5, first column, line 8, claim 12, for "device" read drive; and that the said Letters Patent should be read with these corrections therein that the same may conform to the record of the case in the Patent Office.

Signed and sealed this 14th day of September, A. D. 1937.

(Seal)

Henry Van Arsdale
Acting Commissioner of Patents.